(12) United States Patent
Saiki et al.

(10) Patent No.: US 6,236,439 B1
(45) Date of Patent: *May 22, 2001

(54) WIDE VIEWING ANGLE POLARIZING PLATE AND LIQUID CRYSTAL DISPLAY

(75) Inventors: Yuji Saiki; Minoru Miyatake; Takafumi Sakuramoto; Hiroyuki Yoshimi, all of Osaka (JP)

(73) Assignee: Nitto Denko Corporation, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 34 days.

(21) Appl. No.: 09/294,193

(22) Filed: Apr. 20, 1999

(30) Foreign Application Priority Data

Apr. 20, 1998 (JP) .................................. 10-126882
Mar. 19, 1999 (JP) .................................. 11-075728

(51) Int. Cl.$^7$ ................................................. G02F 113/35
(52) U.S. Cl. ................................................. 349/117
(58) Field of Search ................................. 349/117–121; 385/147

(56) References Cited

U.S. PATENT DOCUMENTS

| | | | |
|---|---|---|---|
| 2,123,901 | 7/1938 | Land | 88/1 |
| 4,688,900 | 8/1987 | Doane et al. | 350/347 V |
| 4,849,623 | * 7/1989 | Osaki et al. . | |
| 4,994,204 | 2/1991 | Doane et al. | 252/299.01 |
| 5,798,837 | * 8/1998 | Aspnes et al. | 250/225 |
| 5,877,859 | * 3/1999 | Aspnes et al. | 356/225 |
| 5,900,939 | * 5/1999 | Aspne et al. | 356/364 |
| 5,973,787 | * 10/1999 | Aspnes et al. | 356/369 |

FOREIGN PATENT DOCUMENTS

| | | | |
|---|---|---|---|
| 0 506 176 | 9/1992 | (EP) | C09K/19/54 |
| 952477 | * 10/1999 | (EP) | 349/117 |
| 9-145921 | 6/1997 | (JP) | G02B/5/30 |
| WO 97-32224 | 9/1997 | (WO) | G02B/5/30 |

OTHER PUBLICATIONS

Patent Abstracts of Japan vol. 098, No. 004 Mar. 31, 1998 & JP 09 325216 A (Nitto Denko Corp) Dec. 16, 1997 *Abstract.
Patent Abstracts of Japan vol. 098, No. 002, Jan. 30, 1998 & JP 274108 A (Teijin Ltd) Oct. 21, 1997 *Abstract.

* cited by examiner

Primary Examiner—Akm E. Ullah
(74) Attorney, Agent, or Firm—Sughrue, Mion, Zinn, Macpeak & Seas, PLLC (57) ABSTRACT

A wide viewing angle polarizing plate has a laminate of a birefringent film having an in-plane average phase difference of from 50 nm to 200 nm made of a transparent resin film having microscopic regions dispersed therein and a polarizing plate. The birefringent film comprises a transparent resin film having microscopic regions dispersed therein and satisfies the relationships $\Delta n^2 \leq 0.03$ and $\Delta n^1 > \Delta n^2$ supposing that the direction of the axis along which linearly polarized light exhibits the maximum transmission is $\Delta n^2$ direction, the difference in refractive index between microscopic regions in $\Delta n^2$ direction and other portions is $\Delta n^2$, the direction perpendicular to $\Delta n^2$ direction is $\Delta n^1$ direction and the difference in refractive index between microscopic regions in $\Delta n^1$ direction and other portions is $\Delta n^1$, and $\Delta n^1$ direction and the retardation axis of said birefringent film and the transmission axis of said polarizing plate are parallel to each other and a liquid crystal display comprising same.

6 Claims, 1 Drawing Sheet

WIDE VIEWING ANGLE POLARIZING PLATE AND LIQUID CRYSTAL DISPLAY

BACKGROUND OF THE INVENTION

1. Field of the Invention

The present invention relates to a wide viewing angle polarizing plate suitable for the improvement in the viewability of transmission type, reflection type or amphibious liquid crystal display, etc.

The present application is based on Japanese Patent Applications No. Hei. 10-126882 and No. Hei. 11-75728, which are incorporated herein by reference.

2. Description of the Related Art

As a wide viewing angle polarizing plate intended for the expansion of the viewing angle or the compensation for the change in phase difference of liquid crystal display there has been heretofore known one comprising a laminate of a polarizing plate and a light diffusing plate or phase difference plate Japanese Patent Publications No. Hei. 9-258013 and 9-325216. However, this wide viewing angle polarizing plate is disadvantageous in that it is liable to contrast drop or blur of display image or leaves something to be desired in the expansion of viewing angle.

SUMMARY OF THE INVENTION

It is an object of the present invention to develop a wide viewing angle polarizing plate which, when provided in a liquid crystal display on the viewing side thereof, acts to compensate for the loss of viewing angle by phase difference as well as expand the viewing angle by light diffusion and thus causes little or no contrast drop or display image blur and a liquid crystal display comprising such a wide viewing angle polarizing plate.

The present invention provides a wide viewing angle polarizing plate comprising a laminate of a polarizing plate and a birefringent film having an in-plane average phase difference of from 50 nm to 200 nm, characterized in that said birefringent film comprises a transparent resin film having microscopic regions dispersed therein and satisfies the relationships $\Delta n^2 \leq 0.03$ and $\Delta n^1 > \Delta n^2$ supposing that the direction of the axis along which linearly polarized light exhibits the maximum transmission is $\Delta n^2$ direction, the difference in refractive index between microscopic regions in $\Delta n^2$ direction and other portions is $\Delta n^2$, the direction perpendicular to $\Delta n^2$ direction is $\Delta n^1$ direction and the difference in refractive index between microscopic regions in $\Delta n^1$ direction and other portions is $\Delta n^1$, and $\Delta n^1$ direction and the retardation axis of said birefringent film and the transmission axis of said polarizing plate are parallel to each other.

In accordance with the present invention, the arrangement of a birefringent film having a predetermined average phase difference such that its retardation axis is parallel to the transmission axis of a polarizing plate makes it possible to inhibit the drop of brightness or contrast in front direction perpendicular to the polarizing plate without being affected by the phase difference in the birefringent film and allows the phase difference in the birefringent film to compensate for the change in the state of linearly polarized light by the birefringence of the liquid crystal cell and apparent deviation in the orthogonal relationship between the linearly polarized light and the absorption axis of the polarizing plate as viewed obliquely during black display, making it possible to inhibit gradation inversion or contrast drop as well as provide a white display having a good viewability and a wide viewing angle attained by scattering and diffusion.

Features and advantages of the invention will be evident from the following detailed description of the preferred embodiments described in conjunction with the attached drawings.

DETAILED DESCRIPTION OF THE PREFERRED EMBODIMENTS

The wide viewing angle polarizing plate according to the present invention comprises a laminate of a polarizing plate and a birefringent film having an in-plane average phase difference of from 50 nm to 200 nm, characterized in that said birefringent film comprises a transparent resin film having microscopic regions dispersed therein and satisfies the relationships $\Delta n^2 \leq 0.03$ and $\Delta n^1 > \Delta n^2$ supposing that the direction of the axis along which linearly polarized light exhibits the maximum transmission is $\Delta n^2$ direction, the difference in refractive index between microscopic regions in $\Delta n^2$ direction and other portions is $\Delta n^2$, the direction perpendicular to $\Delta n^2$ direction is $\Delta n^1$ direction and the difference in refractive index between microscopic regions in $\Delta n^1$ direction and other portions is $\Delta n^1$, and $\Delta n^1$ direction and the retardation axis of said birefringent film and the transmission axis of said polarizing plate are parallel to each other.

Figure 1:
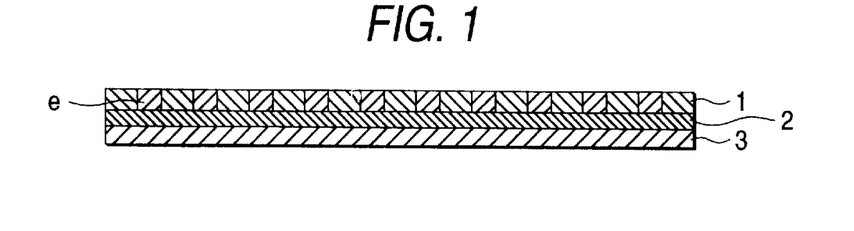
FIG. 1 is a sectional view of an embodiment of the wide viewing angle polarizing plate.

An embodiment of the foregoing wide viewing angle polarizing plate is shown in FIG. 1. The reference numeral 1 indicates a birefringent film. The reference numeral 3 indicates a polarizing plate. The symbol e indicates a microscopic region in the birefringent film 1. The reference numeral 2 is an adhesive layer which is optionally provided. The birefringent film 1 may consist of one sheet of a film or a laminate of a plurality of birefringent films.

The formation of the birefringent film made of a transparent resin film having microscopic regions dispersed therein can be accomplished by any proper process as disclosed in JP-A-9-274108 such as process which comprises forming a film from one or more proper materials excellent in transparency such a resin and liquid crystal in a combination such that regions having different birefringent indexes are formed when the film is stretched. In some detail, the formation of the birefringent film made of a transparent resin film having microscopic regions dispersed therein can be accomplished by a process which comprises mixing one or more resins for forming the transparent resin film and one or more liquid-crystalline thermoplastic resins for forming a microscopic region, forming from the mixture a transparent resin film having the liquid-crystalline thermoplastic resin dispersed therein in the form of microscopic region, and then subjecting the film to proper orientation so that regions having different birefringent indexes are formed therein. Examples of the foregoing combination include combination of resin and liquid crystal, combination of isotropic resin and anisotropic resin, and combination of anisotropic resins. From the standpoint of dispersion distribution of microscopic regions, a combination which undergoes phase separation is preferred. By properly selecting the compatibility of materials to be combined, the dispersion distribution of microscopic regions can be controlled. The phase separation can be accomplished by a proper process such as process which comprises treating immiscible materials with a solvent to make a solution and process which comprises mixing miscible materials while being melted under heating.

The foregoing combination of polymer and liquid crystal or isotropic polymer and anisotropic polymer can be oriented at an arbitrary temperature and draw ratio to form a desired oriented film. On the other hand, the foregoing combination of anisotropic polymers can be oriented at an arbitrary draw ratio at which the refractive index in the foregoing $\Delta n^2$ direction satisfy the foregoing $\Delta n^2$ to form a desired oriented film.

Anisotropic polymers can be classified as positive or negative anisotropic polymer by the characteristics of change in the refractive index in the orientation direction. In the present invention, either positive or negative anisotropic polymer may be used. Either a combination of positive anisotropic polymers or negative anisotropic polymers or a combination of a positive anisotropic polymer and a negative anisotropic polymer may be used. From the standpoint of orientability, polymers having an excellent ductility are preferred to brittle polymers.

As the resin forming the foregoing transparent resin film there may be used a proper resin excellent in light transmission properties, particularly light transmittance, without any special restriction. Accordingly, the heat resistance of the resin to be used herein can be properly predetermined. Examples of the foregoing resin include polyester resin such as polyethylene terephthalate and polyethylene naphthalate, styrene resin such as polystyrene and acrylonitrile-styrene copolymer, and olefin resin such as polyethylene, polypropylene, polyolefin having cyclo or norbornene structure and ethylene-propylene copolymer.

Further examples of the foregoing resin include acrylic resin such as polymethyl methacrylate, cellulose resin such as cellulose diacetate and cellulose triacetate, amide resin such as nylon and aromatic polyamide, carbonate resin, vinyl chloride resin, imide resin, sulfone resin, polyethersulfon resin, polyether ether ketone resin, polyphenylene sulfide resin, vinyl alcohol resin, vinylidene chloride resin, vinyl butyral resin, arylate resin, polyoxymethylene resin, and blend thereof. From the standpoint of heat resistance or the like, a resin having a glass transition point of not lower than 70° C., particularly not lower than 80° C., more particularly not lower than 100° C. is desirable. If used in liquid crystal display or the like, a resin excellent in light transmittance in the visible range is preferably used.

On the other hand, as the liquid-crystalline thermoplastic resin for forming microscopic region there may be any proper liquid-crystalline polymer such as main chain type and side chain type polymers which can be hot-melted. Thus, the kind of the liquid-crystalline thermoplastic resin employable herein is not specifically limited. From the standpoint of the controllability of the foregoing refractive index difference $\Delta n^1$ and $\Delta n^2$ by orientation, a resin which exhibits a glass transition temperature of not lower than 50° C. and is in a nematic liquid crystal phase at a temperature range of lower than the glass transition temperature of the resin for forming the transparent resin film to be used incombination therewith. Specific examples of such a resin include a side chain type liquid-crystalline polymer having a monomer unit represented by the following general formula:

In the foregoing general formula, X represents a skeleton group constituting the main chain of a liquid-crystalline thermoplastic resin which may be formed by a proper connecting chain such as linear chain, branched chain and cyclic chain. Specific examples of such a skeleton group include polyacrylate, polymethacrylate, poly-α-haloacrylate, poly-α-cyanoacrylate, polyacrylamide, polyacrylonitrile, polymethacrylonitrile, polyamide, polyester, polyurethane, polyether, polyimide, and polysiloxane.

Y represents a spacer group branched from the main chain. From the standpoint of the formability of birefringent film for controlling refractive index or the like, the spacer group Y is preferably ethylene, propylene, butylene, pentylene or hexylene. Particularly preferred among these groups is ethylene.

On the other hand, Z represents a mesogen group for rendering the resin nematically orientable. Examples of such a mesogen group include the following compounds.

-continued

The end substituent A in the foregoing compounds may be a proper group such as cyano group, alkyl group, alkenyl group, alkoxy group, oxalkyl group, and haloalkyl, haloalkoxy or haloalkenyl group having one or more hydrogen atoms substituted by fluorine or chlorine.

In the foregoing general formula, the spacer group Y and the mesogen group Z may be connected to each other with an ether bond, i.e., —O—. The phenyl group in the mesogen group Z may have one or two hydrogen atoms substituted by halogen. The halogen, if any, is preferably chlorine or fluorine.

The foregoing nematically orientable side chain type liquid crystal polymer (liquid-crystalline thermoplastic resin) may be a proper liquid-crystalline thermoplastic resin such as homopolymer or copolymer having a monomer unit represented by the foregoing general formula. In particular, a liquid-crystalline thermoplastic resin excellent in monodomain orientability is desirable.

The formation of the birefringent film comprising the foregoing nematically orientable liquid-crystalline thermoplastic resin can be accomplished, e.g., by a process which comprises mixing a resin for forming a transparent resin film and a liquid-crystalline thermoplastic resin having a glass transition temperature of not lower than 50° C., particularly not lower than 60° C., more particularly not lower than 70° C., which is in a nematic liquid crystal phase in a temperature range of lower than the glass transition temperature of the foregoing resin to form a resin film having the liquid-crystalline thermoplastic resin dispersed therein in the form of microscopic region, subjecting the liquid-crystalline thermoplastic resin forming the microscopic regions to heat treatment so that it is oriented in a nematic liquid crystal phase, and then cooling the resin to fix the orientation.

As the foregoing combination of a resin for forming a transparent resin film and a liquid-crystalline thermoplastic resin there is preferably used a combination of materials which are not completely miscible with each other, particularly materials which undergo phase separation, from the standpoint of the dispersion distribution of microscopic regions in the resulting birefringent film. Such a combination can provide a proper compatibility by which the dispersion distribution of microscopic regions is controlled. The phase separation can be accomplished by a proper process such as process which comprises treating immiscible materials with a solvent to make a solution and process which comprises mixing miscible materials while being melted under heating.

The formation of the transparent resin film having a liquid-crystalline thermoplastic resin dispersed therein in the form of microscopic region, i.e., film to be oriented can be accomplished by any proper process such as casting process, extrusion process, injection molding process, rolling process and flow casting process. Alternatively, it can be accomplished by a process which comprises developing these materials in the form of monomer, subjecting these materials to polymerization by heat treatment or treatment by radiation such as ultraviolet rays, and then forming the polymerized material into a film.

In order to obtain a birefringent film excellent in uniformity in the distribution of microscopic regions, a process is preferably used which comprises subjecting a solution of a mixture of forming materials obtained with a solvent to casting, flow casting or the like to form a film. In accordance with this process, the kind of the solvent used, the viscosity of the mixture and the drying speed of the mixture-developed layer can be properly selected to control the size or distribution of the microscopic regions. The reduction of the area of microscopic regions can be effectively accomplished by lowering the viscosity of the mixture or raising the drying speed of the mixture-developed layer.

The thickness of the film to be oriented may be properly predetermined. In practice, however, it is from 1 $\mu$m to 3 mm, particularly from 5 $\mu$m to 1 mm, more particularly from 10 $\mu$m to 500 $\mu$m, from the standpoint of orientability. A proper additive such as dispersant, surface active agent, ultraviolet absorber, color tone controller, fire retardant, releasing agent and oxidation inhibitor may be added to the film-forming materials during the film formation.

The orientation of the film can be accomplished, e.g., by a process which comprises heating the film to a temperature range in which the liquid-crystalline thermoplastic resin dispersed in the transparent resin film in the form of microscopic region is in a desired liquid crystal phase such as nematic phase so that it is melted, orienting the film thus melted under the action of orientation force, and then rapidly cooling the film to fix the orientation. The film is preferably oriented in a monodomain state as much as possible to inhibit the dispersion of optical properties.

As the foregoing orientation force there may be used any proper force by which the liquid-crystalline thermoplastic resin can be oriented, such as stretching force as used in a process involving the stretching of a transparent resin film at a proper draw ratio, shearing force as used in film formation, electric field and magnetic field. Under one or more of these forces, the liquid-crystalline thermoplastic resin can be oriented.

Accordingly, the portion other than the microscopic regions made of a liquid-crystalline thermoplastic resin in the birefringent film may be either birefringent or isotropic. If the entire birefringent film thus oriented by stretching or the like exhibits birefringence, the entire phase difference can be determined by the phase difference derived from the resin forming the transparent resin film and the phase difference derived from the liquid-crystalline thermoplastic resin. In general, the value of the phase difference of the birefringent film is additive.

The birefringent film wherein the portion other than the microscopic regions made of a liquid-crystalline thermoplastic resin is isotropic can be obtained by a process which comprises forming a transparent resin film from an isotropic resin, and then stretching the film in a temperature range of not higher than the glass transition temperature of the resin.

The birefringent film to be used in the present invention is controlled such that the in-plane average phase difference is from 50 nm to 200 nm and $\Delta n^2$ is not more than 0.03 and $\Delta n^1$ is greater than $\Delta n^2$ supposing that the direction of the axis along which linearly polarized light exhibits the maximum transmission is $\Delta n^2$ direction, the difference in refractive index between microscopic regions in $\Delta n^2$ direction and other portions is $\Delta n^2{}_1$ the direction perpendicular to $\Delta n^2$ direction is $\Delta n^1$ direction and the difference in refractive index between microscopic regions in $\Delta n^1$ direction and other portions is $\Delta n^1$, and $\Delta n^1$ direction. The arrangement of refractive index with the above defined range makes it possible to provide a birefringent film excellent in scattering in $\Delta n^1$ direction and retention of polarization and linear transmission in $\Delta n^2$ direction.

If the foregoing in-plane average phase difference falls below 50 nm, the resulting effect of compensating for the change in the viewing angle is insufficient. On the contrary, if the foregoing in-plane average phase difference exceeds 200 nm, the resulting dispersion of birefringence difference by wavelength causes color change such as coloring. Thus, in either case, the angle at which the display can be fairly recognized can be hardly expanded. In order to expand the angle at which the display can be fairly recognized, the in-plane average phase difference is preferably from 70 nm to 180 nm, particularly from 100 nm to 150 nm.

On the other hand, from the standpoint of scattering properties or the like, the refractive index difference $\Delta n^1$ in $\Delta n^1$ direction is preferably great to a proper extent, more preferably from 0.04 to 1, particularly from 0.045 to 0.5. Further, from the standpoint of retention of polarization, the refractive index difference in $\Delta n^2$ direction is preferably as small as possible, more preferably not more than 0.025, particularly not more than 0.020, more particularly not more than 0.015.

The foregoing orientation can also be defined as process which comprises orienting the liquid-crystalline thermoplastic resin forming microscopic regions in as constant a direction as possible to raise the refractive index difference in $\Delta n^1$ direction and/or reduce the refractive index difference in $\Delta n^2$ direction.

Accordingly, from the standpoint of accomplishment of the foregoing refractive index difference properties, a transparent film-forming resin and a liquid-crystalline thermoplastic resin can be used in a combination such that the former resin has a refractive index coinciding with the ordinary ray refractive index of the latter resin forming microscopic regions as much as possible and properly differing from the extraordinary ray refractive index of the latter resin to form a birefringent film to advantage.

The microscopic regions are preferably dispersed in the birefringent film as uniformly as possible from the standpoint of uniformity in the foregoing scattering effect or the like. The size of microscopic regions, particularly length of microscopic regions in $\Delta n^1$ direction, i.e., scattering direction is related to back scattering (refection) or dependence on wavelength. In order to enhance the percent utilization of light or inhibit the coloring due to dependence on wavelength or the obstruction of viewing due to visual observation of microscopic regions or sharp display or from the standpoint of film forming properties or film strength, the size of microscopic regions, particularly length in $\Delta n^1$ direction is preferably from 0.05 μm to 500 μm, particularly from 0.1 μm to 250 μm, more particularly from 1 μm to 100 μm. The microscopic regions normally lie in the birefringent film in the form of domain. The length in $\Delta n^2$ direction is not specifically limited.

The proportion of the microscopic regions in the birefringent film can be properly determined taking into account the in-plane average phase difference or scatting in $\Delta n^1$ direction. In practice, however, it is preferably from 0.1 to 70% by weight, particularly from 0.5 to 50% by weight, more particularly from 1 to 30% by weight, taking into account the film strength as well. The microscopic region made of a liquid-crystalline thermoplastic resin in the birefringent film may have the same thickness as that of the birefringent film or a smaller thickness than that of the birefringent film. In this case, the microscopic regions may be vertically superimposed on each other.

The birefringent film may be in the form of single layer 1 as shown in FIG. 1 or a laminate of two or more such layers. The lamination of birefringent films makes it possible to exert a synergistic scattering effect surpassing the effect developed by the addition of thickness. The laminate may be a combination of birefringent films laminated at an arbitrary orientation angle in $\Delta n^1$ or $\Delta n^2$ direction. From the standpoint of enhancement of scattering effect, however, these birefringent films are preferably laminated in such an arrangement that they are parallel to each other in $\Delta n^1$ direction. The number of the birefringent films to be laminated is arbitrary as two or more.

The birefringent films to be laminated may have the same or different $\Delta n^1$'s or $\Delta n^2$'s. These birefringent films are preferably laminated as parallel to each other as possible in $\Delta n^1$ direction or the like. However, deviation due to operational error can be tolerated. If $\Delta n^1$ direction or the like is scattered, they are averaged.

The birefringent films may be merely superimposed on each other to form a laminate. In order to inhibit deviation in $\Delta n^1$ direction or the like or entrance of foreign matters into various interfaces, these films are bonded to each other with an adhesive layer or the like. In order to bond these films, a proper transparent adhesive such as acrylic adhesive, silicone-based adhesive, polyester-based adhesive, polyurethane-based adhesive, polyether-based adhesive and rubber adhesive may be used. The kind of the adhesive to be used herein is not specifically limited.

In order to inhibit reflection loss, an adhesive layer having as small a refractive index difference from that of the birefringent film on both sides thereof as possible is desirable. These birefringent films may be bonded to each other with a resin which can form a birefringent film. Further, in order to inhibit the change in optical properties, an adhesive layer requiring no high temperature process during hardening or drying or no prolonged hardening or drying process is desirable. Moreover, an adhesive layer which doesn't undergo peeling or the like under heating or moistening.

From these standpoints of view, an acrylic adhesive made of an acrylic polymer having a weight-average molecular weight of not lower than 100,000 and a glass transition temperature of not higher than 0° C. comprising a monomer such as butyl (meth)acrylate, methyl (meth)acrylate, ethyl (meth)acrylate and (meth)acrylic acid is preferably used in particular. Such an acrylic adhesive is also advantageous in that it is excellent in transparency, weathering resistance or heat resistance.

The adhesive to be used herein may comprise any proper additives such as natural and synthetic resins, fillers made of glass fiber, glass bead, metal powder and other inorganic powder, pigments, coloring agents and oxidation inhibitors incorporated therein as necessary. Further, the adhesive to be used herein may comprise finely divided particles incorporated therein to form a light diffusing adhesive layer.

The wide viewing angle polarizing plate according to the present invention comprises a laminate of a birefringent film 1 and a polarizing plate 3 as shown in FIG. 1 and thus can be preferably used to compensate for the loss of the viewability of the liquid crystal cell by birefringence. As the foregoing polarizing plate there may be used a proper material capable of producing linearly polarized light. There are various types of polarizing plates such as absorption type, scattering type and reflection type polarizing plates. The wide viewing angle polarizing plate according to the present invention can be applied to any of these types of polarizing plates.

Specific examples of the foregoing polarizing plate include absorption type polarizing film obtained by allowing a hydrophilic high molecular film such as polyvinyl alcohol-based film, partially-formalated polyvinyl alcohol-based film and ethylene-vinyl acetate copolymer-based partially-saponified film to adsorb a dichromatic material such as iodine and dichromatic dye, and then stretching the film, and polarizing film of the type having a polyene such as dehydration product of polyvinyl alcohol and dehydrochloration product of polyvinyl chloride oriented therein.

Further, a protective type polarizing plate which comprises a transparent protective layer made of plastic-coating layer, film-laminating layer or the like provided on one or both sides of the foregoing polarizing film for the purpose of protecting the water resistance thereof may be used. Moreover, a scattering type polarizing plate obtained by a process which comprises incorporating a transparent particulate material having an average particle diameter of from 0.5 to 50 $\mu$m such as inorganic particulate material which may be electrically conductive (e.g., silica, alumina, titania, zirconia, tin oxide, indium oxide, cadmium oxide and antimony oxide) and organic particulate material (e.g., crosslinked or uncrosslinked polymer) in the transparent protective layer to provide the surface of the transparent protective layer with a finely roughened structure may be used.

In addition, a reflection type polarizing plate obtained by providing the foregoing transparent protective layer which may have a finely roughened structure provided on the surface thereof with a reflective layer made of vapor-deposited metal layer, deposited metal layer, resin layer comprising a metal powder incorporated therein or metal foil may be used. As the polarizing plate there may be preferably used one having a high polarization degree, particularly a light transmission of not lower than 40% and a polarization degree of not lower than 95.0%, more particularly not lower than 99%, such as the foregoing dichromatic material-containing absorption type polarizing plate.

The wide viewing angle polarizing plate according to the present invention may be practically used in the form of laminate with proper optical parts or optical layers. In order to form such a laminate, the various layers, including the polarizing plate, may be merely superimposed on each other. In order to inhibit deviation or entrance of foreign matters into various interfaces, however, the various layers are preferably bonded to each other with an adhesive layer as necessary. As the adhesive layer which is optically used there may be used those described with reference to the foregoing lamination of birefringent films.

The wide viewing angle polarizing plate according to the present invention, including those having optical parts or optical layers added thereto as necessary, can be formed by a process which comprises sequentially and separately laminating the various constituent layers during the formation of a liquid crystal display. However, a previous lamination process which comprises previously laminating the constituent layers with an adhesive is preferred because it provides an excellent quality stability or efficiency in laminating to enhance the efficiency of production of liquid crystal display, etc.

The foregoing optical parts or optical layers to be superimposed on the wide viewing angle polarizing plate are not specifically limited. Examples of these optical parts or optical layers include back light such as phase difference plate and light-guiding plate, polarized light-separating plate made of reflective plate, multi-layer film or the like, liquid crystal cell, glare protective layer, and antireflection layer.

Specific examples of the foregoing phase difference plate include oriented film made of resins exemplified with reference to the foregoing birefringent film, and liquid crystal polymer, particularly torsionally-oriented liquid crystal polymer. As the phase difference plate employable herein there may be used any of various types of phase difference plates such as ¼ wavelength plate, ½ wavelength plate, monoaxially-oriented type plate, biaxially-oriented type plate, gradient type plate molecularly oriented vertically as well, liquid crystal type plate, plate of the type which compensates for viewing angle or phase difference due to birefringence, and laminate thereof.

Specific examples of the light-guiding plate include a light-guiding plate which comprises a linear light source such as cold or hot cathode ray tube or a light source such as light emitting diode and EL provided on the side of a transparent resin plate in such an arrangement that light transmitted by the resin plate undergoes diffusion, reflection, diffraction or interference to come out of the resin plate at one side thereof.

The formation of the wide viewing angle polarizing plate comprising a light-guiding plate can be accomplished by arranging auxiliary means such as prism array layer made of prism sheet for controlling the emission direction of light, diffusing plate for providing uniform emission and light source holder for introducing emission from a linear light source into the side surface of the light-guiding plate, singly or in combination as necessary, on a predetermined position such as upper, lower or side surface of the light-guiding plate to form a proper combination. As the reflective plate there may be used a reflective plate or reflective layer exemplified above with reference to reflective polarizing plate.

On the other hand, the glare protective layer is provided to prevent external light from being reflected by the surface of the wide viewing angle polarizing plate or liquid crystal display to prevent the viewer from viewing the light transmitted by the wide viewing angle polarizing plate or display image. The glare protective layer (non-glare layer) can be provided in the form of layer having a finely roughened surface structure attained by a proper process such as resin layer having a finely roughened surface structure attained by the incorporation of a transparent particulate material and sheet having a finely roughened surface structure attained by sandblasting or embossing. Accordingly, the glare protective layer can be provided as an optical layer added to the surface of the wide viewing angle polarizing plate, etc.

The antireflection layer is provided to inhibit the reflection loss of light transmitted by the wide viewing angle polarizing plate or liquid crystal cell or inhibit the obstruction of viewing by the surface reflection of light coming into the wide viewing angle polarizing plate or liquid crystal display as in the foregoing glare protective layer. The antireflection layer can be formed, e.g., by a process which comprises adding a coherent single-layer or multi-layer vapor-deposited film to a sheet or the like. Accordingly, the antireflection layer, too, can be provided as an optical layer added to the surface of the wide viewing angle polarizing plate, etc.

The laminate constituting the wide viewing angle polarizing plate according to the present invention comprises one or more optical parts or optical layers other than birefringent film and polarizing plate as mentioned above. In this arrangement, two or more optical parts of the same kind such as phase difference plate may be laminated. These optical parts of the same kind, if any, may have the same or different properties.

One or more birefringent films forming the wide viewing angle polarizing plate may be provided on a proper position outside or inside the laminate such as one or both external surfaces of the laminate and one or both surfaces of optical parts constituting the laminate. Accordingly, the wide viewing angle polarizing plate may comprise the constituent birefringent film and polarizing plate provided adjacent to each other or with other optical parts interposed therebetween.

The foregoing various layers constituting the wide viewing angle polarizing plate such as polarizing plate, birefringent film, optical parts and optical layer may be subjected to treatment with an ultraviolet absorber such as salicylic acid ester compound, benzophenol compound, benzotriazole compound, cyanoacrylate compound and nickel complex compound to have an ultraviolet absorptivity.

Figure 2:
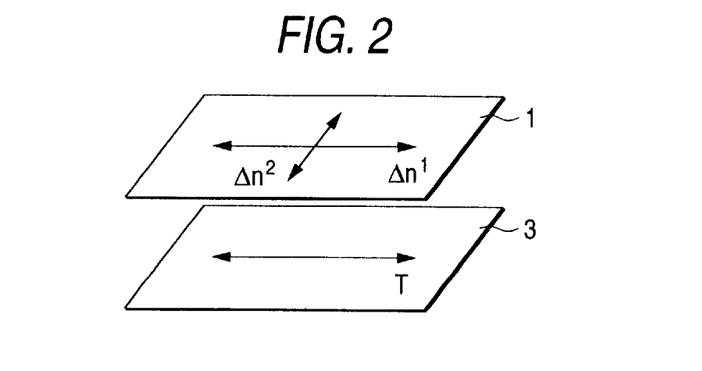
FIG. 2 is a diagram illustrating the positional relationship between birefringent film and polarizing plate.

Referring to the positional relationship between the birefringent film and the polarizing plate constituting the wide viewing angle polarizing plate, the birefringent film 1 and the polarizing plate 3 are disposed in such an arrangement that $\Delta n^1$ direction, i.e., retardation axis of the birefringent film 1 and the transmission axis T of the polarizing plate 3 are parallel to each other as shown by the arrow in FIG. 2 from the standpoint of effective utilization of transmission and scattering properties of the birefringent film. In this arrangement, the foregoing object of the present invention can be accomplished. The foregoing parallelism is as defined above with reference to the lamination of birefringent films.

Figure 3:
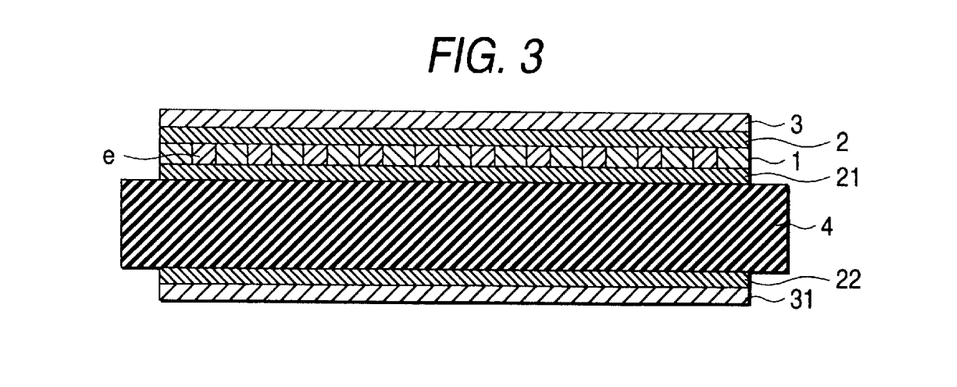
FIG. 3 is a sectional view of an embodiment of the liquid crystal display.
Figure 4:
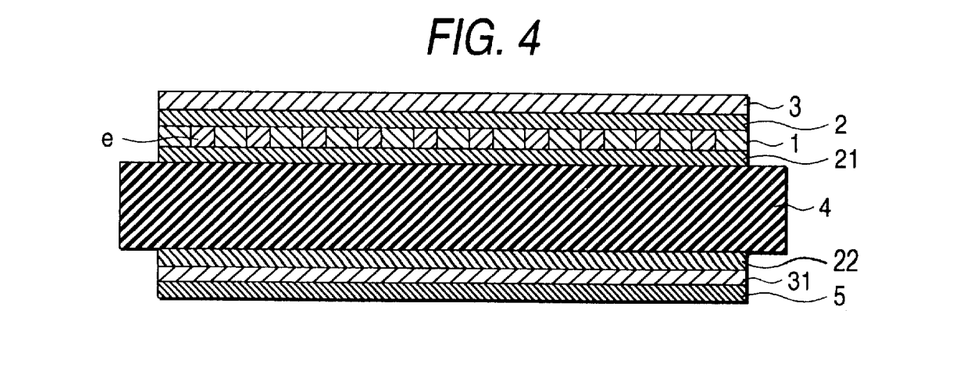
FIG. 4 is a sectional view of another embodiment of the liquid crystal display.

Because of the foregoing advantages, the wide viewing angle polarizing plate according to the present invention is preferably used to form a transmission type, reflection type or amphibious liquid crystal display. Embodiments of such a liquid crystal display are shown in FIGS. 3 and 4. The reference numerals 3 and 31 each indicate a polarizing plate. The reference numeral 4 indicates a liquid crystal cell. The reference numeral 5 indicates a mirror-like reflective plate. FIG. 3 illustrates an embodiment of transmission type liquid crystal display. FIG. 4 illustrates an embodiment of reflective type liquid crystal display. In the transmission type liquid crystal display of FIG. 3, the back light system which is normally provided on the polarizing plate at the side thereof opposite the viewing side is not shown.

In the foregoing illustrations, the wide viewing angle polarizing plate is provided on the viewing side of the liquid crystal cell 4 while the birefringent film 1 is provided thereinside. This positional relationship is normally desirable from the standpoint of viewability. In practice, however, the position of the wide viewing angle polarizing plate may be properly determined. For the reflective type liquid crystal display, the polarizing plate 3 may be provided inside the laminate. For the transmission type liquid crystal display, the wide viewing angle polarizing plate may be provided on the liquid crystal cell 4 on the side thereof opposite the viewing side.

The formation of the liquid crystal display can be normally accomplished by properly assembling a polarizing plate, a liquid crystal cell, a reflective plate or back light, and optically constituent parts such as optical parts, and then incorporating a driving circuit into the assembly. In the present invention, this assembly procedure is not limited except for the use of the foregoing wide viewing angle polarizing plate. Thus, the liquid crystal display can be formed in accordance with the conventional method.

Accordingly, the liquid crystal display can be produced in a form comprising a wide viewing angle polarizing plate provided on one or both sides of a liquid crystal cell or a form comprising a back light, reflective plate or semi-reflective plate as an illumination system as mentioned above. In this case, the wide viewing angle polarizing plate preferably comprises its birefringent film disposed interposed between the liquid crystal cell and the polarizing film, particularly the polarizing film on the viewing side, from the standpoint of compensating effect as previously mentioned.

Referring to the assembly of the liquid crystal display, proper optical parts or optical layers such as glare protective layer or antireflection layer to be provided on the viewing side surface of the display, protective layer or plate and phase difference compensating plate to be provided between the liquid crystal cell and the polarizing plate on the viewing side may be provided on a proper position, singly or in combination, as in the foregoing case of wide viewing angle polarizing plate comprising optical parts or optical layers added thereto.

The foregoing phase difference compensating plate is intended to compensate for dependence of birefringence on wavelength and hence improve the viewability of the liquid crystal display. The phase difference compensating plate may be disposed, e.g., between the polarizing plate on the viewing side and/or back side and the liquid crystal cell. As such a phase difference compensating plate there may be used any proper material such as the foregoing phase difference plate depending on the wavelength range used. The phase difference compensating plate to be used herein may consist of two or more phase difference layers.

As mentioned above, one or more wide viewing angle polarizing plates may be provided on one or both sides of the liquid crystal cell at a proper position. In this arrangement, the wide viewing angle polarizing plate can be used in the form of laminate with adjacent optical parts or the like. The various parts constituting the liquid crystal display may be disposed separated from each other. As illustrated, however, they are preferably integrally bonded to each other with adhesive layers 21 and 22 provided interposed therebetween.

The wide viewing angle polarizing plate according to the present invention can be preferably used in various display devices such as TFT type or MIM type display comprising a liquid crystal cell showing birefringence such as TN type or STN type liquid crystal cell.

EXAMPLE

Example 1

A 18 wt-% dichloromethane solution containing 300 parts (hereinafter by weight) of AS resin and 100 parts of a cyano-based nematic liquid crystal (GR-41, produced by Chisso Corporation) were mixed, and then subjected to casting to obtain a film having a thickness of 20 μm. The film thus obtained was stretched at a draw ratio of 1.2 to form an oriented film having a refractive index difference $\Delta n^1$ of 0.20, a refractive index difference $\Delta n^2$ of 0.007, an in-plane average phase difference of 110 nm and a retardation axis corresponding to $\Delta n^1$ direction. The oriented film thus obtained and a commercially available polarizing plate having a total light transmittance of 41% and a transmitted light polarization degree of 99% were then bonded to each other with an acrylic adhesive layer provided interposed therebetween in such an arrangement that $\Delta n^1$ direction and the transmission axis coincide with each other to obtain a wide viewing angle polarizing plate.

Subsequently, the foregoing wide viewing angle polarizing plate was bonded to a liquid crystal cell with an acrylic adhesive layer with the oriented film being disposed thereinside in such an arrangement that $\Delta n^2$ direction corresponds to black display. To the other surface of the liquid crystal cell was then bonded a polarizing plate with an acrylic adhesive layer to obtain a transmission type liquid crystal display. The foregoing oriented film was found to have domain portions made of a cyano-based nematic liquid crystal dispersed therein in particulate form with a good distribution. The domain was observed under a polarizing microscope at a 200× magnification to determine its average diameter on the basis of coloring by phase difference. The results were about 1 μm.

Comparative Example 1

The procedure of Example 1 was followed except that the wide viewing angle polarizing plate comprising an oriented film was not used but the polarizing plate alone was used. Thus, a liquid crystal display was obtained.

Comparative Example 2

The procedure of Example 1 was followed except that a (wide viewing angle) polarizing plate comprising a light diffusing plate having a transparent particulate material incorporated therein and hence exhibiting an in-plane average phase difference of 5 nm instead of the oriented film was used. Thus, a liquid crystal display was obtained.

Comparative Example 3

The procedure of Example 1 was followed except that a (wide viewing angle) polarizing plate comprising as an oriented film a monoaxially-oriented polycarbonate film having an in-plane average phase difference of 115 nm was used. Thus, a liquid crystal display was obtained.

The foregoing results are set forth in Table 1 below.

TABLE 1

| Example No. | Contrast | Display image blur | Light diffusivity | Viewing angle |
| --- | --- | --- | --- | --- |
| Example 1 | Good | None | Good | Good |
| Comparative Example 1 | Good | None | Poor | Poor |
| Comparative Example 2 | Poor | Some | Good | Fair |
| Comparative Example 3 | Good | None | Poor | Good |

Example 2

10 parts (hereinafter by weight) of a liquid-crystalline thermoplastic resin represented by the following general formula having a glass transition temperature of 80° C. which is in a nematic liquid crystal phase at a temperature of from 100° C. to 290° C. were dissolved in a 20 wt-% dichloromethane solution containing 990 parts of a norbornene resin (Arton, produced by JSR Corp.) having a loaded deflection temperature of 165° C. and a glass transition temperature of 182° C. The solution thus obtained was then casted to form a transparent resin film having a thickness of 50 μm. The transparent resin film thus obtained was stretched at a temperature of 185° C. and a draw ratio of 3, and then rapidly cooled to obtain a birefringent film having a refractive index difference $\Delta n^1$ of 0.230 and a refractive index difference $\Delta n^2$ of 0.029.

The foregoing birefringent film was found to have a liquid-crystalline thermoplastic resin dispersed in the transparent film made of a norbornene resin in the form of domains which are ellipsoidal in the orienting direction and have almost the same shape. These domains were measured for average diameter on the basis of coloring by phase difference under a polarizing microscope. As a result, the average length in $\Delta n^1$ direction was 5 μm. The birefringent film was subjected to spectroscopy to determine the in-plane average phase difference thereof. The results were 150 nm. The retardation axis and $\Delta n^1$ direction were found parallel to each other.

Subsequently, the foregoing birefringent film and a commercially available polarizing plate having a total light transmittance of 41% and a transmitted light polarization degree of 99% were bonded to each other with an acrylic adhesive layer provided interposed therebetween in such an arrangement that $\Delta n^1$ direction of the birefringent film and the transmission axis of the polarizing plate are parallel to each other to obtain a wide viewing angle polarizing plate.

Subsequently, the foregoing wide viewing angle polarizing plate was bonded to a liquid crystal cell with an acrylic adhesive layer with the oriented film being disposed thereinside in such an arrangement that $\Delta n^2$ direction corresponds to black display. To the other surface of the liquid crystal cell was then bonded a polarizing plate with an acrylic adhesive layer to obtain a transmission type liquid crystal display.

Example 3

10 parts of a liquid-crystalline thermoplastic resin represented by the following general formula having a glass transition temperature of 90° C. which is in a nematic liquid crystal phase at a temperature of from 120° C. to 200° C. were dissolved in a 20 wt-% dichloromethane solution containing 990 parts of a polycarbonate having a glass transition temperature of 150° C. The solution thus obtained was then casted to form a transparent resin film having a thickness of 70 μm. The transparent resin film thus obtained was stretched at a temperature of 185° C. and a draw ratio of 1.5, and then rapidly cooled to obtain a birefringent film having a refractive index difference $\Delta n^1$ of 0.151 and a refractive index difference $\Delta n^2$ of 0.012.

The foregoing birefringent film was found to have a liquid-crystalline thermoplastic resin dispersed in the transparent film made of a polycarbonate resin in the form of domains which are ellipsoidal in the orienting direction and have almost the same shape. These domains were measured for average diameter on the basis of coloring by phase difference under a polarizing microscope. As a result, the average length in $\Delta n^1$ direction was 6 μm. The birefringent film was subjected to spectroscopy to determine the in-plane average phase difference thereof. The results were 150 nm. The retardation axis and $\Delta n^1$ direction were found parallel to each other. Subsequently, the foregoing birefringent film was processed in the same manner as in Example 1 to obtain a wide viewing angle polarizing plate. Subsequently, the foregoing wide viewing angle polarizing plate was processed in the same manner as in Example 1 to obtain a transmission type liquid crystal display.

Comparative Example 4

The procedure of Example 1 was followed except that a polarizing plate alone was used instead of the wide viewing angle polarizing plate. Thus, a transmission type liquid crystal display was obtained.

Comparative Example 5

The procedure of Example 1 was followed except that a diffusing polarizing plate comprising a light diffusing plate having a transparent particulate material incorporated therein and hence exhibiting an in-plane average phase difference of 5 nm instead of birefringent film was used instead of the wide viewing angle polarizing plate. Thus, a transmission type liquid crystal display was obtained.

Comparative Example 6

The procedure of Example 1 was followed except that an ellipsoidal polarizing plate comprising a monoaxially-oriented film of polycarbonate having an in-plane average phase difference of 120 nm as a birefringent film was used instead of the wide viewing angle polarizing plate. Thus, a transmission type liquid crystal display was obtained.

Evaluating Test

The liquid crystal displays obtained in the foregoing examples and comparative examples were each provided on a back light with its (wide viewing angle) polarizing plate side being disposed on the viewing side, and then evaluated for contrast, display image blur, light diffusivity and viewing angle in accordance with a three-stage criterion (good, fair, poor).

The foregoing results are set forth in Table 2 below.

TABLE 2

| Example No. | Contrast | Display image blur | Light diffusivity | Viewing angle |
|---|---|---|---|---|
| Example 1 | Good | None | Good | Good |
| Example 2 | Good | None | Good | Good |
| Comparative Example 1 | Good | None | Poor | Poor |
| Comparative Example 2 | Poor | Some | Good | Fair |
| Comparative Example 3 | Good | None | Poor | Good |

As can be seen in the table above, the liquid crystal displays of Examples 1 and 2 show no contrast drop and display image blur, a good light diffusivity and a wide viewing angle.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A wide viewing angle polarizing plate comprising:
 a laminate of a polarizing plate; and
 a birefringent film having an in-plane average phase difference of from 50 nm to 200 nm,
 wherein said birefringent film comprises a transparent resin film having microscopic regions dispersed therein and satisfies the relationships $\Delta n^2 \leq 0.03$ and $\Delta n^1 > \Delta n^2$ supposing that the direction of the axis along which linearly polarized light exhibits the maximum transmission is $\Delta n^2$ direction, the difference in refractive index between microscopic regions in $\Delta n^2$ direction and other portions is $\Delta n^2$, the direction perpendicular to $\Delta n^2$ direction is $\Delta n^1$ direction and the difference in refractive index between microscopic regions in $\Delta n^1$ direction and other portions is $\Delta n^1$, and $\Delta n^1$ direction and the retardation axis of said birefringent film and the transmission axis of said polarizing plate are parallel to each other.

2. A wide viewing angle polarizing plate according to claim 1, wherein said microscopic regions are made of a liquid-crystalline thermoplastic resin.

3. The wide viewing angle polarizing plate according to claim 2, wherein said liquid-crystalline thermoplastic resin exhibits a glass transition temperature of not lower than 50° C. and is in a nematic liquid crystal phase in a temperature range of lower than the glass transition temperature of the resin constituting said transparent resin film.

4. A liquid crystal display comprising:
 a liquid crystal cell; and
 a wide viewing angle polarizing plate provided on either or both sides of a liquid crystal cell, said wide viewing angle polarizing plate comprising:
 a laminate of a polarizing plate; and
 a birefringent film having an in-plane average phase difference of from 50 nm to 200 nm,
 wherein said birefringent film comprises a transparent resin film having microscopic regions dispersed therein and satisfies the relationships $\Delta n^2 \leq 0.03$ and $\Delta n^1 > \Delta n^2$ supposing that the direction of the axis along which linearly polarized light exhibits the maximum transmission is $\Delta n^2$ direction, the difference in refractive index between microscopic regions in $\Delta n^2$ direction and other portions is $\Delta n^2$, the direction perpendicular to $\Delta n^2$ direction is $\Delta n^1$ direction and the difference in refractive index between microscopic regions in $\Delta n^1$ direction and other portions is $\Delta n^1$, and $\Delta n^1$ direction and the retardation axis of said birefringent film and the transmission axis of said polarizing plate are parallel to each other.

5. A liquid crystal display according to claim 4, wherein said polarizing plate and said birefringent film are bonded to said liquid crystal cell with an acrylic adhesive layer provided interposed therebetween and said birefringent film being disposed thereinside.

6. A liquid crystal display according to claim 4, further comprising a glare protective layer or antireflection layer provided on the viewing side surface thereof.

* * * * *